INVENTOR.
Jerrold D. Hoffman

BY

Hovey, Schmidt, Johnson & Hovey
ATTORNEYS.

INVENTOR.
Jerrold D. Hoffman
BY
Hovey, Schmidt, Johnson & Hovey
ATTORNEYS.

SEQUENTIAL CODED RINGING OF PARTY LINE TELEPHONES

Filed May 12, 1964 Sheet 3 of 3

INVENTOR.
Jerrold D. Hoffman
BY
Hovey, Schmidt, Johnson & Hovey
ATTORNEYS.

United States Patent Office 3,428,750
Patented Feb. 18, 1969

3,428,750

SEQUENTIAL CODED RINGING OF PARTY LINE TELEPHONES

Jerrold D. Hoffman, Udall, Kans. 76364

Filed May 12, 1964, Ser. No. 366,810
U.S. Cl. 179—5 5 Claims
Int. Cl. H04m *11/04;* H04q *5/00*

ABSTRACT OF THE DISCLOSURE

In a party line telephone system, the various ringing generators are sequentially coupled with each line of the system by automatic switching circuitry which is initiated to notify the subscribers of the existence of an emergency condition. The output of each ringing generator is repeatedly interrupted in a predetermined pattern during each interval that such generator is coupled to a line, in order to provide a special ringing code which is identifiable by the subscriber as an emergency warning rather than a call.

This invention relates to apparatus for warning telephone subscribers in the event of severe weather conditions or the possiblity of nuclear attack and, more particularly, to a telephone warning system for use with party line telephone systems in rural communities.

In metropolitan areas the problem of warning the inhabitants of an emergency condition, or of an impending disaster, is simplified by the fact that such inhabitants are concentrated in a relatively small area. Thus, sirens or other audible warning devices are capable of effectively covering the area. In rural communities, however, dwellings are so widely scattered that such warning means are completely ineffective. For this reason, rural inhabitants are subject to dangers, especially severe weather, without the benefit of advance warning except by means of radio or television. However, this latter mode of communication presupposes that the listener or viewer is constantly monitoring a local radio or television station which, of course, is rarely the case except perhaps during the early evening hours.

One remaining means of communication available to rural dwellers is the telephone. Rural subscribers are usually served by party lines and, therefore, only a few telephone lines often serve a wide area containing a large number of subscribers.

It is, therefore, the primary object of this invention to provide a means of ringing in code the telephones connected to a party line so that the subscribers may be warned of emergency conditions or an impending disaster.

It is another important object of this invention to provide means which may be interposed in a party line to ring all of the telephone instruments thereon rapidly and with a predetermined code.

Still another important object of this invention is to provide a telephone alarm system as aforesaid which is operable from a location remote from the central office equipment, such a weather station, sheriff's office, or the like.

A further object of the instant invention is to provide means which will automatically successively couple the ringing generators of the central office equipment with the party lines to be energized to effect coded ringing of all of the telephone instruments thereon.

Other objects will become apparent as the detailed description proceeds.

Figure 1:
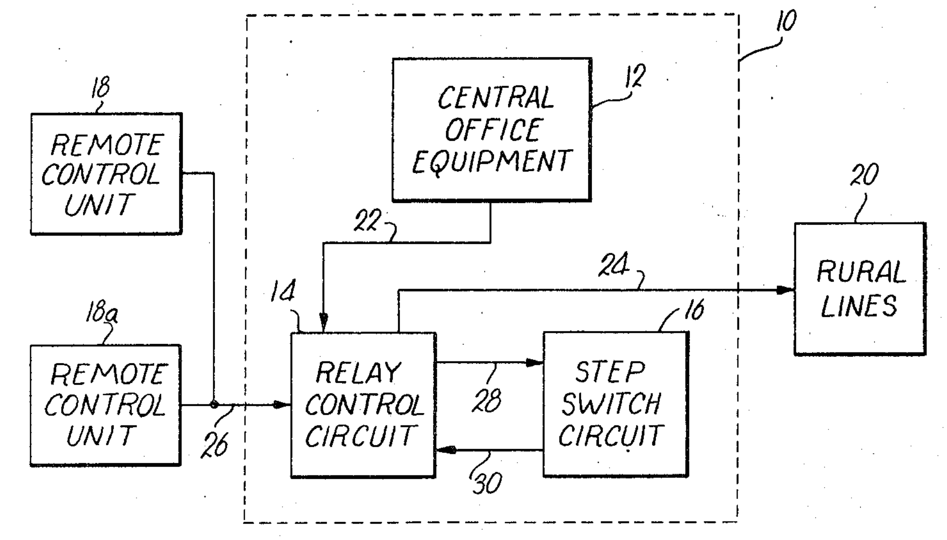
FIGURE 1 is a block diagram showing the system concept of the instant invention.

Briefly, the system concept of the instant invention may be understood by reference to FIGURE 1. The central telephone office of a rural exchange is illustrated by the broken line block 10, such central office including equipment 12, such as a switchboard and associated components, for routing incoming and outgoing calls, a relay control circuit 14 forming a part of this invention, and a step switch circuit 16 which is also a part of the invention. Outside of the central office, a pair of identical remote control units 18 and 18*a* are illustrated along with the rural lines 20 which extend to the various telephone subscribers.

Under normal operating conditions, an incoming call reaching the central office equipment 12 is routed through relay control circuit 14 and on to the appropriate rural line 20, as illustrated by flow lines 22 and 24. However, assuming that some emergency condition comes into existence, operation of one of the remote control unit 18 or 18*a* causes actuation of the relay control circuit to, in turn, disconnect the central office equipment 12 from the telephone lines and interpose step switch circuit 16 therein. This is illustrated by flow lines 26, 28, 30 and 24. As will be more fully appreciated hereinafter, step switch circuit 16 effects coded ringing of the telephones on the rural lines so that the subscribers will be warned of the emergency. This is done in a manner such that the ringer in each telephone will be energized even if such telephone is in use at the time of the emergency.

Figure 2:
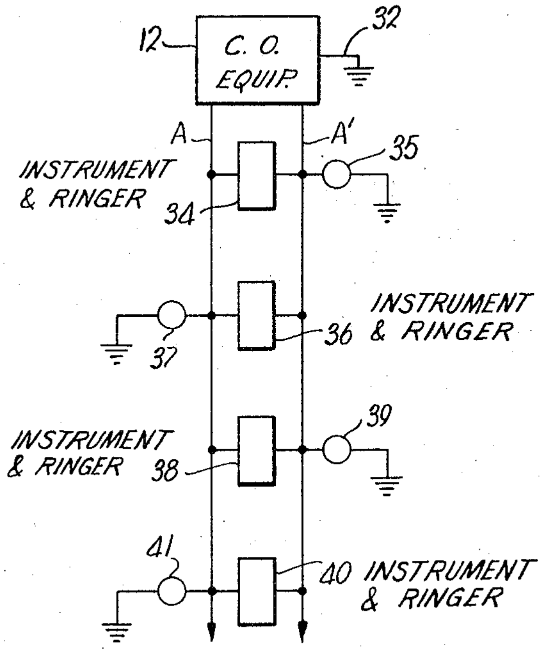
FIG. 2 is a diagrammatic representation of a portion of a party line.

Referring now to FIG. 2, it may be seen that the central office equipment is there illustrated as having a ground connection 32. A representative party line A–A′ is shown coupled with equipment 12 for the purpose of illustrating the normal operation of the party line system. Telephone instruments are illustrated at 34, 36, 38 and 40, these instruments having associated ringers or bells 35, 37, 39 and 41. It should be understood that each instrument and ringer may be spaced a great distance from the next instrument-ringer and that, therefore, party line A–A′ may thus constitute the telephone service available to a wide rural area.

Only four instruments are shown in FIG. 2 for the purpose of illustrating the normal manner in which the ringer of a selected instrumt is energized when that particular subscriber has a call. It may be noted that each instrument is coupled directly across the two conductors of line A–A′, but that each ringer is connected between one conductor A or A′ and ground. Ringer 35 and ringer 37 are each responsive to an audio frequency signal of a given frequency (30 c.p.s. for example), while ringers 39 and 41 are each responsive to an audio signal of a different frequency (40 c.p.s., for example). Thus, it is evident that, when a 30 c.p.s. signal is impressed by equipment 12 between conductor A′ and ground 32, ringer 35 will be energized and the subscriber will realize that he has a call. If, on the other hand, a 30 c.p.s. signal is impressed between conductor A and ground 32, ringer 37 will be energized and the subscriber will be apprised that he is being called. Thus, although ringers 35 and 37 are responsive to the same frequency, neither subscriber will be aware of the fact that line A–A′ is in use when the other subscriber is called.

It is evident that the party line system shown in FIG. 2 is capable of serving twice as many subscribers as there are ringing frequencies. This particular system is in common and widespread use and has the particular advantage over other, older systems in that the telephone of the rural subscriber never rings unless that particular subscriber is the one being called. It should be understood that the description and operation of the invention hereinafter will be based upon a system wherein five ringing frequencies are employed and where, therefore, each party line has a ten subscriber capability.

Figure 3:
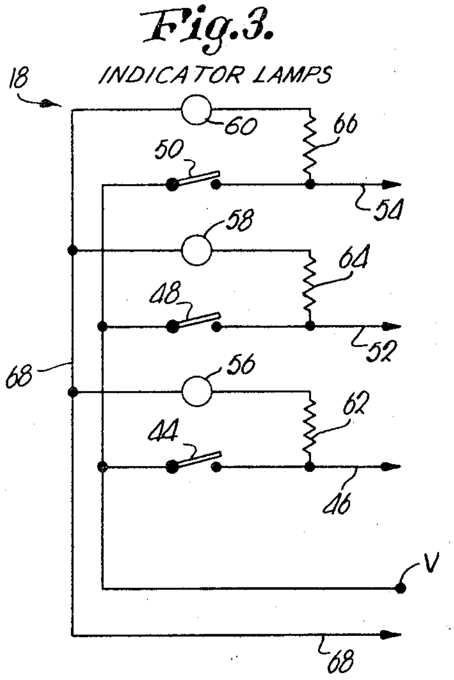
FIG. 3 is a schematic diagram of the remote control unit of the instant invention.

The remote control unit 18 is shown in FIG. 3. A normally open, manually operable switch 44 is employed to connect terminal V with lead 46 upon closure thereof. It should be understood that terminal V represents a connection to the ungrounded terminal of a direct current power source which may be the power source normally utilized to energize the telephone lines. Hereinafter in the specification and in FIGS. 4 and 5 of the drawings, all terminals designated V will be understood to represent connections to the ungrounded power source terminal.

Additional switches 48 and 50 are also coupled with terminal V and serve to couple this terminal with leads 52 and 54, respectively, upon closure of the associated switch. Three indicator lamps 56, 58 and 60 are associated with switches 44, 48 and 50 and connected with respective leads 46, 52 and 54 by resistors 62, 64 and 66. A common lead 68 interconnects the other side of the lamps as shown. Lamps 56, 58 and 60 are energized upon closure of the respective switch 44, 48 or 50 and are thus employed as a means of indicating system operation in a manner to be fully described hereinafter.

It should be understood at this junction that each lead 46, 52 and 54 is coupled with an independent relay control circuit 14 and that, therefore, there are as many relay control circuits as there are switches in the remot control unit 18. Each relay control circuit 14 is employed to connect a particular group of rural lines 20 with the coded ringing apparatus of the instant invention; therefore, each of the switchese 44, 48 and 50 represents a particular rural area served by that group of lines coupled with the corresponding relay control circuit. The utility of this arrangement may be appreciated if, for example, it is assumed that a particular county or rural subdivision is divided into three sections by appropriate grouping of the rural party lines. Thus, should the weather bureau determine that a tornado is moving into one particular section, but will not disturb the other two sections, then the weather bureau could warn the residents of that section in the path of the tornado by closing the appropriate switch.

Figure 4:
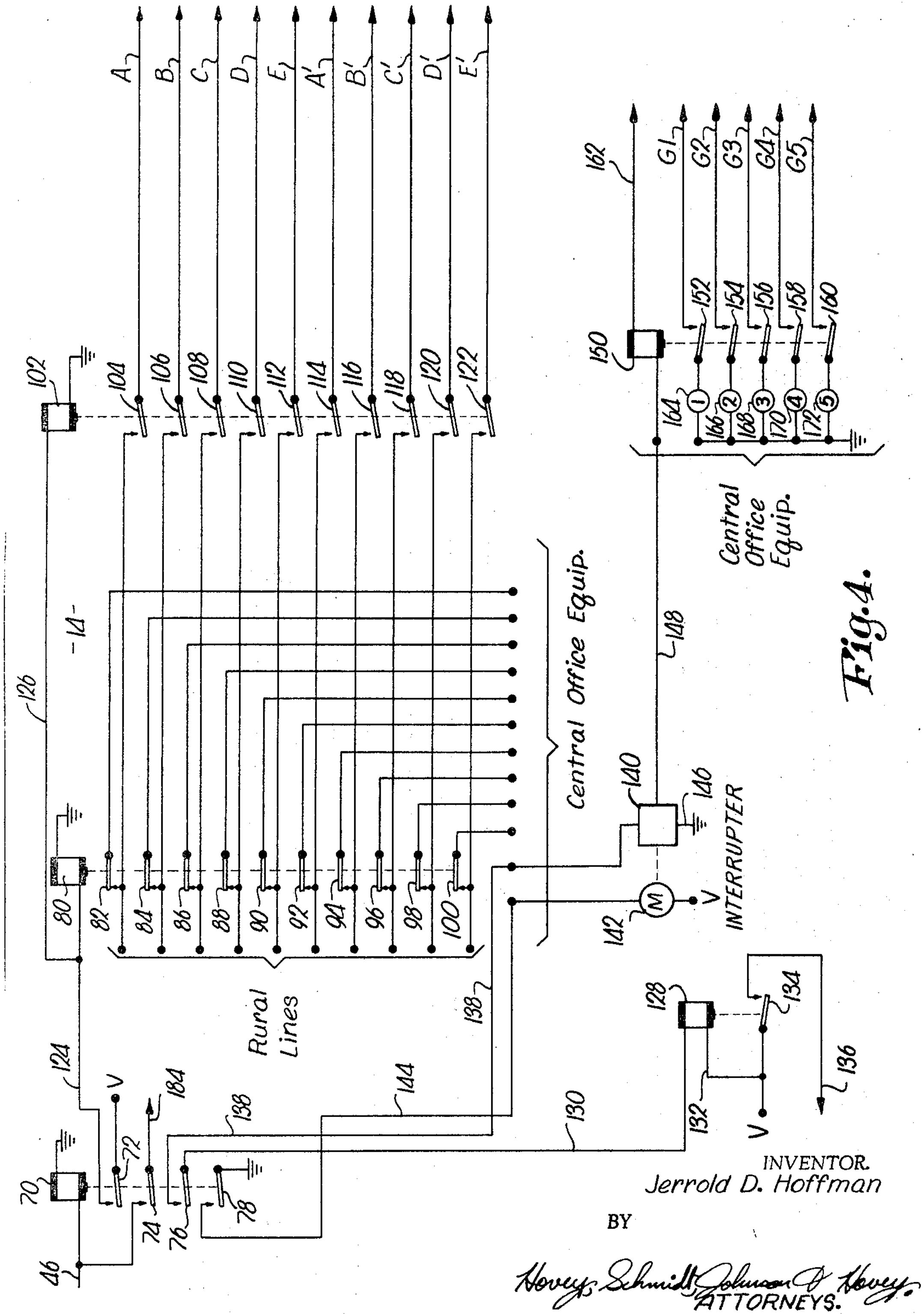
FIG. 4 is a schematic diagram showing the relay control circuit of the invention.

In FIG. 4 the relay control circuit 14 for one of the groups of rural lines is shown. FIGS. 3 and 4 may be correlated by noting that lead 46 interconnects these two figures, lead 46 in FIG. 4 being shown in the upper left-hand corner thereof. Lead 46 is coupled with a relay coil 70 which is operably coupled with four switches 72, 74, 76 and 78. Coil 70 and switches 72–78 comprise an electromechanical relay, the switches being in the open position shown when coil 70 is de-energized.

A relay coil 80 is operably associated with ten switches 82, 84, 86, 88, 90, 92, 94, 96, 98 and 100, these switches being in the closed positions shown when coil 80 is de-energized. A relay coil 102 is operably coupled with ten switches 104, 106, 108, 110, 112, 114, 116, 118, 120 and 122, such switches being in the open positions illustrated when coil 102 is de-energized. Relay coils 80 and 102 and their associated switches serve to automatically disconnect the rural lines from the central office equipment and connect the apparatus of the instant invention thereto when switch 44 of the remote control unit is closed. It should be noted that five rural lines are shown in FIG. 4 and are designated A–A′, B–B′, C–C′, D–D′ and E–E′.

The power circuit for relay coils 80 and 102 comprises switch 72, which is coupled with the ungrounded terminal V of the power source, lead 124 interconnecting switch 72 and coil 80, and lead 126 connecting lead 124 with coil 102. Therefore, upon energization of relay coil 70 and closure of switch 72, relay coils 80 and 102 are energized to thereby open switches 82–100 and close switches 104–122. The telephone lines thus become disconnected from the central office equipment and connected with circuitry to be described hereinafter. It should be understood that the transmission lines are connected to the left-hand terminals, as viewed in FIG. 4, of lines A–A′—E–E′, such terminals being connected to respective fixed contacts of switches 82–100.

A relay coil 128 is connected by lead 130 to the movable pole of switch 76, and also by lead 132 to the ungrounded terminal V of the power source. A normally open switch 134 is operated by relay coil 128, switch 134 serving to connect lead 136 with terminal V upon closure thereof.

A lead 138 connects the fixed contact of switch 76 with the switching structure 140 of a time responsive circuit interrupter. The interrupter also includes an electric motor 142 which drives the switching structure, such motor being connected by lead 144 to the fixed contact of switch 78. It will be appreciated that, upon closure of switch 78, the power circuit from motor 142 is completed from the V terminal connected to motor 142, through the motor and along lead 144 to the fixed contact of switch 78, and hence to the grounded movable pole of switch 78. The interrupter device may comprise a part of the central office equipment as illustrated. Normally, in telephone systems of the type herein described, a time responsive interrupter is employed to create the intermittent circuit making and breaking necessary to place "busy" signals on the telephone lines and cause intermittent operation of the ringers on telephone instruments when parties are called. Switching structure 140 commonly takes the form of a cam, driven at a constant speed by motor 142, and a number of switches which are repeatedly opened and closed by the cam during movement thereof. Since such structure is conventional and well known in the art, a detailed description thereof will not be understaken in this specification.

It should be noted that switching structure 140 is provided with a ground connection 146 and a lead 148 which connects structure 140 with a relay coil 150. Relay coil 150 and its five, normally open switches 152, 154, 156, 158 and 160 associated therewith are not a part of the central office equipment. The other electrical side of coil 150 is connected to a lead 162, the switches 152–160 being interposed in series with leads G1, G2, G3, G4 and G5, respectively. Five ringing generators 164, 166, 168, 170 and 172 are interposed in series with leads G1–G5, respectively, and also serially connected with corresponding switches 152–160. One side of the generators 164–172 is grounded as shown. Each generator delivers an output signal of a different frequency, exemplary output frequencies for the generators being 20, 30, 40, 50, and 60 c.p.s. for generators 164–172, respectively.

Figure 5:
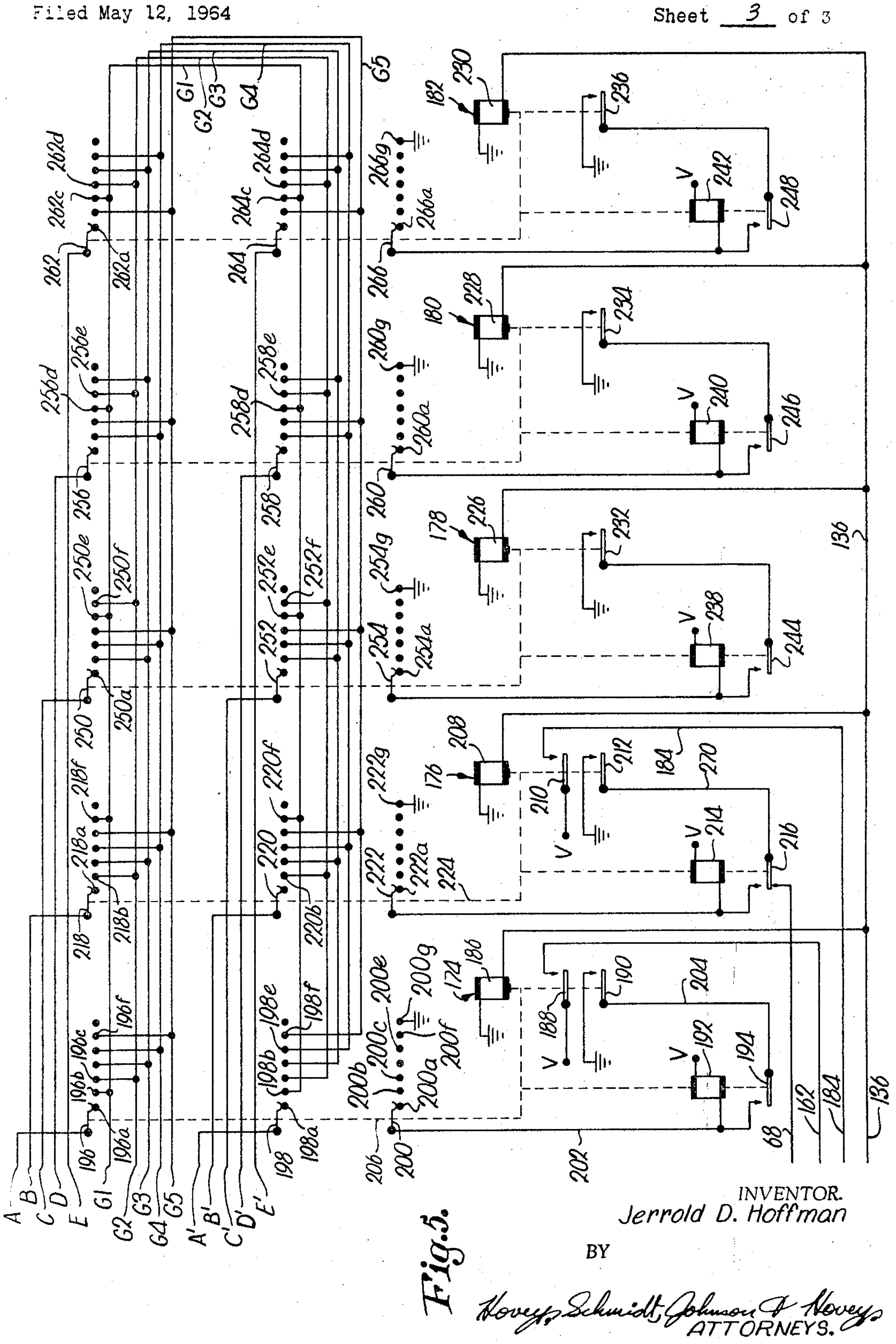
FIG. 5 is a schematic diagram of the step switch circuit of this invention.

Reference is now made to FIG. 5 where the step switch circuit of the instant invention is illustrated. This circuitry comprises five stepper relays 174, 176, 178, 180 and 182. Each of these stepper relays is identical in construction and comprises a commercially available device, such as an XY Deca switch manufactured by Stromberg-Carlson Corporation. Only the switch elements and contacts of the steppers 174–182 that are used in the instant circuitry are illustrated in FIG. 5 to simplify the drawings.

It should be understood that FIGS. 4 and 5 are interrelated, the right-hand terminations, as viewed in FIG. 4, of conductors A–E and A′–E′ of the telephone lines, being connected to correspondingly referenced conductors A–E and A′–E′ shown in the upper left-hand portion of FIG. 5. Furthermore, the terminations of leads G1–G5 shown in FIG. 4 are connected with correspondingly labeled leads G1–G5 in the upper left-hand portion of FIG. 5. Additionally, lead 136 coupled with switch 134, shown in the lower left-hand corner of FIG. 4 continues to FIG. 5 and is shown along the lower margin thereof; a lead 184 coupled with the movable pole of switch 74 in the upper left-hand corner of FIG. 4 continues to FIG. 5 and is shown in the lower left-hand corner thereof; and lead 162, shown in the left-hand corner of FIG. 4, continues over to and enters FIG. 5 at the lower left-hand corner thereof. Also, FIGS. 3 and 5 are interconnected by lead 68.

Stepper relay 174 includes a stepping solenoid 186, a pair of normally open switches 188 and 190 responsive to energization of solenoid 186, a return solenoid 192, a normally open switch 194 responsive to solenoid 192, a first wiper or switch element 196, a second wiper or switch element 198, and a third, return wiper 200. Wiper 196 is connected to line A and has a series of contacts or terminals **196*a*, 196*b*, 196*c*, 196*d*, 196*e* and 196*f* associated therewith. In similar fashion, wiper 198 is connected to conductor A' and has a series of contacts or terminals 198*a*–198*f* associated therewith. Wiper 200 has a series of contacts 200*a*–200*g* associated therewith and is connected by lead 202 to one electrical side of solenoid 192 and the fixed contact of switch 194. The other electrical side of solenoid 192** is connected to the ungrounded terminal V of the power source.

The movable pole of switch 188 is also connected to a terminal V, while the stationary contact thereof is connected with lead 162. The stationary contact of switch 190 is grounded, the movable pole thereof being connected by a lead 204 to the movable pole of switch 194. It should be understood that mechanical linkage 206, illustrated by broken lines, operably interconnects solenoid 186, solenoid 192, switches 188 and 190, switch 194, and wipers 196, 198, and 200.

Stepper relay 176 includes a solenoid 208, a pair of normally open switches 210 and 212 responsive to solenoid 208, a return solenoid 214, a single-pole, double-throw switch 216 responsive to solenoid 214, a first wiper 218, a series of contacts **218*a*–218*f* operably associated with wiper 218, a second wiper 220, a series of contacts 220*a*–220*f* associated with wiper 220, a third, return wiper 222, and a series of contacts 222*a*–222*g* associated with wiper 222. Mechanical linkage 224, illustrated by broken lines, operably intercouples the various components of stepper relay 176 in the same manner as for stepper 174. Wiper 218 is connected to conductor B, while terminals 198*a*–198*f* associated therewith. Wiper 200 has solenoids 208 and 214 and their associated switches are electrically interconnected in the same manner as corresponding components in stepper relay 174. Lead 184 is connected to the stationary contact of switch 210**.

Stepper relays 178, 180 and 182 have components identical to those described hereinabove for steppers 174 and 176 and these components are interconnected electrically and mechanically in the same manner as above. Note, however, that the stepper solenoids 226, 228 and 230 of stepper relays 178–182, respectively, are each operably coupled with only a single switch 232, 234 or 236. Additionally, return solenoids 238, 240, and 242 are respectively coupled with normally open switches 244, 246 and 248. Otherwise, a mechanical and electrical arrangement for steppers 178–182 is identical to steppers 174 and 176.

The wipers 250 and 252 of stepper 178 are connected respectively with conductors C and C', the return wiper being designated 254. The wipers 256 and 258 of stepper 180 are respectively connected to conductors D and D', the return wiper being designated 260. Wipers 262 and 264 of stepper 182 are connected to conductors E and E', respectively, the return wiper being designated 266. The contacts associated with the various wipers 250–266 are designated by the same reference numerals as their associated wiper with the addition of a, b, c, d, e, f, or g.

In FIG. 5 lead G1 is connected with contacts **196*b*, 218*f*, 250*e*, 256*d*, 262*c*, 264*c*, 258*d*, 252*e*, 220*f*, and 198*b*. Lead G2 is connected to contacts 196*c*, 218*b*, 250*f*, 256*e*, 262*d*, 264*d*, 258*e*, 252*f*, 220*b* and 198*c***.

Leads G3, G4 and G5 are connected to the various contacts of the relays in like fashion, it being evident from FIG. 5 that leads G1–G5 are connected with separate contacts of each wiper and that each lead G1–G5 is connected to a correspondingly different contact of each wiper connected to a different telephone line.

*Operation*

Upon closure of switch 44 of remote control unit 18, electrical energy flows from terminal V in unit 18 through closed switch 44 and along lead 46 to relay coil 70 and ground. This closes switches 72–78 thereby energizing relay coils 80 and 102. As explained hereinabove, the energization of relay coils 80 and 102 disconnects the telephone transmission lines from the central office equipment and couples the same with the apparatus of the instant invention.

Closure of switch 78 establishes continuity in the power circuit of motor 142 to thereby drive the switching structure 140. Structure 140 is so arranged that lead 138 is momentarily grounded through connection 146 once every three seconds. Since switch 76 is now closed, this causes momentary energization of relay coil 128 once every three seconds and, in turn, momentary closure of switch 134.

Simultaneously with the above, the cam and switch arrangement within structure 140 causes the lead 148 to be repeatedly grounded through connection 146 at a rate of once every second. Desirably, lead 148 will be alternately grounded and disconnected from ground every one-half second. This, in turn, will effect energization of relay coil 150 for a period of one-half second out of every second when switch 188 of stepper relay 174 closes.

Before proceeding into the operation of the stepper relay circuitry, it should be noted that ringing generators 164–172 are in operation, as is generally the case in telephone equipment. Thus, during the half second period when switches 152–160 are closed, the output signals from each of the generators will appear on respective leads G1–G5.

Referring to FIG. 5, it may be seen that lead 136 is connected to all of the stepping solenoids 186, 208, 226, 228 and 230. Therefore, once relay coil 128 is placed in operation by the energization of relay coil 70, the five stepping solenoids will be energized once every three seconds. The power circuit from these solenoids extends from the V terminal connected to the movable pole of switch 134, through the fixed contact of switch 134 upon closure thereof, and thence along lead 136 to the five stepping solenoids and the ground connections thereto. When these solenoids are first energized, switches 188 and 190, 210 and 212, 232, 234 and 236 close. These switches then are maintained in the closed position until the end of the stepping cycle. This is accomplished by a mechanical interlock (not shown) which maintains the switches in the closed position until the return solenoids 192, 214, 238, 240 and 242 are energized, and the various wipers are returned to their normal positions as shown.

Initial energization of the five stepping solenoids causes the wipers associated therewith to advance one step and move from their *a* contacts to their *b* contacts. Closure of switch 188 connects lead 162 to a V terminal, thereby making power available to relay coil 150. As discussed hereinabove, lead 148 from coil 150 is grounded once every second. Therefore, with all of the wipers now engaged with their *b* contacts, a 3-ring code will be placed on all of the telephone lines.

To explain more fully, looking only at stepping relay 174, it is assumed that wipers 196 and 198 have taken the first step and are now engaged with cantacts **196*b* and 198*b***, respectively. This connects conductors A and A' with lead G1 so that the ringing generator signal appearing on G1 will be transmitted to the telephone subscribers on party line A–A′. Since solenoid 186 is only energized once every three seconds, wipers 196 and 198 will dwell for approximately three seconds on each contact. During this three second interval, however, relay coil 150 in FIG. 4 "pulses" three times and, for this reason, the ringers of the telephones on line A–A′, responsive to the 20 c.p.s. output signal of ringing generator 164, will be energized. After the close of the first three second interval, stepping solenoid 186 is again momentarily energized to move wipers 196 and 198 to contacts 196c and 198c respectively. Hence, the 30 c.p.s. signal appearing on lead G2 will now be transmitted along line A–A′. As the stepping operation continues, all five of the frequencies will be transmitted along line A–A′ until, finally, wiper 200 reaches contact 200g, whereupon return solenoid 192 is energized to shift the wipers in unison to their normal positions as shown.

The same action as described for stepper relay 174 is true for the remaining steppers 176–182. Stepper 176, by way of its wipers 218 and 220, effects energization of line B–B′ in the same fashion. One difference exists, however, in that the connections of leads G1–G5 to the various contacts of the steppers are "staggered" so that each ringing generator is coupled with only one telephone line during a given three second interval. In this summer, overload of the generators is prevented and yet all of the telephone lines receive the output signals from all of the ringing generators.

Since one output terminal of each of the generators 164–172 is grounded, a return path for the ringing signals is provided because of the ground connection which is also present at the telephone instrument ringers. Thus, it may be appreciated from viewing FIG. 2 that both of the ringers (ringers 35 and 37, for example) will be energized so that both subscribers having ringers responsive to the same frequency will be simultaneously warned by the coded ringing.

It should be noted that a holding circuit is provided so that the steppers will be operated through at least one complete cycle if any of the switches are closed in the remote control unit. The holding circuit comprises switch 74, lead 184, and switch 210 of stepper 176. As explained hereinabove, after one step the switches responsive to the stepping solenoids remain closed until the end of the stepping cycle; therefore, a power circuit is created from the V terminal connected to switch 210, along lead 184 to switch 74 in FIG. 4, and hence to lead 46 and the relay coil 70 to ground.

In order to give the operator of the remote control unit a visual indication of proper warning system operation, indicator lamp 56 becomes energized upon closure of switch 44. The power circuit for this lamp, and for the other lamps 58 and 60 if their associated switches are closed, is not readily apparent from the drawings until it is remembered that a separate relay control circuit 14 is coupled with each of the leads 46, 52 and 54. Thus, when switch 44 is first closed, current will flow from the V terminal in FIG. 3, through switch 44, to resistor 62, through lamp 56 to lead 68, and thence through the other lamps 58 and 60 and resistors 64 and 66 to leads 52 and 54. These latter leads are connected to a relay coil which operates, of course, in identical fashion to coil 70 shown in FIG. 4. Since one side of each of these coils is grounded, a high resistance current path is presented through lamp 56 so that the same will become dimly illuminated.

Once proper operation of the step switch circuit of FIG. 5 begins, however, lead 68 becomes directly connected to ground through a low resistance path. This path is through switch 216 of stepper 176, along lead 270 to switch 212, and thence to ground upon closure of switch 212 by the operation of stepper relay 176. Since switch 212 will not close until the stepping operation begins, it is evident that bright light supervision will not be enjoyed by the operator unless proper system operation occurs.

Having thus described the invention, what is claimed as new and desired to be secured by Letters Patent is:

1. In a party line telephone system having a number of ringing generators delivering output signals of different frequencies, and where each of said generators is employed to ring at least one particular telephone instrument on the party line, apparatus for effecting coded ringing of all the instruments on the line in the event of an emergency comprising:

circuit means adapted to be coupled with the outputs of said generators;

electrically responsive switching means adapted for coupling with said line and coupled with said circuit means for successively applying the output signals from said generators to said line upon repeated excitation of said switching means;

coding means adapted to be operably associated with said generators and having a first operational state permitting said output signals to flow in said circuit means and a second operational state preventing said flow; and control means coupled with said coding means and said switching means for repeatedly exciting the latter and for simultaneously operating the coding means to repeatedly change the operational state thereof a preselected number of times during each interval between successive applications of said excitation to the switching means, whereby to effect coded ringing of all of said telephone instruments, said coding means including electrically responsive switching structure normally in one of said states, said control means including electrical energy supply means, circuitry operably coupling said supply means with said switching means and said switching structure, and timer means interposed in said circuitry for controlling the flow of electrical energy therein to effect said repeated excitation of the switching means and to control excitation of the switching structure to change the state thereof said preselected number of times during each interval between successive applications of excitation to the switching means.

2. The invention of claim 1, wherein said control means further includes a remote control unit having a manually operable switch for rendering the control means operative and an indicator lamp responsive to operation of said switch, there being means intercoupling said lamp and said switching means and responsive to operation of the latter for increasing the voltage across the lamp, whereby the brilliance of the lamp is increased to indicate proper operation of the switching means.

3. In a telephone system having at least a pair of party lines and a number of ringing generators delivering output signals of different frequencies, and where each of said generators is employed to ring at least one particular telephone instrument on each of the party lines, apparatus for effecting coded ringing of all the instruments on the lines in the event of an emergency comprising:

first electrically responsive switching means having a series of switching terminals and adapted to be coupled with one of said lines for successively connecting said switching terminals to said one line upon repeated excitation of said switching means;

second electrically responsive switching means having a series of switching terminals and adapted to be coupled with the other of said lines for successively connecting the last-mentioned switching terminals to said other line in the same sequence as said first switching means upon repeated excitation of said second switching means;

circuit means adapted to be coupled with the outputs of said generators and coupled with the switching terminals of said first and second switching means, said circuit means including circuitry for routing the output signal from each of said generators respectively to correspondingly different switching terminals of said first and second switching means;

coding means adapted to be operably associated with said generators and having a first operational state permitting said output signals to flow in said circuit means and a second operational state preventing said flow; and control means coupled with said coding means and said first and second switching means for repeatedly exciting the first and second switching means and for simultaneously operating the coding means to repeatedly change the operational state thereof a preselected number of times during each interval between successive applications of said excitation to the first and second switching means, whereby to effect coded ringing of all of said telephone instruments on the party lines, said coding means including electrically responsive switching structure normally in one of said states, said control means including electrical energy supply means, second circuit means operably coupling said supply means with said first and second switching means and said switching structure, and timing means interposed in said second circuit means for controlling the flow of electrical energy therein to effect said repeated excitation of the first and second switching means and to control excitation of the switching structure to change the state thereof said preselected number of times during each interval between successive applications of excitation to the first and second switching means.

4. In a party line telephone system where a number of ringing signals are employed having different electrical characteristics, and where each of said signals effects ringing of at least one particular telephone instrument on the party line, apparatus for effecting coded ringing of all the instruments on the line in the event of an emergency comprising:

terminal means;

circuit means coupled with said terminal means for applying said signals thereto;

electrically responsive switching means adapted for coupling with said line and coupled with said terminal means for successively applying said signals to said line upon repeated excitation of said switching means;

coding means coupled with said circuit means and having a first operational state permitting said signals to flow to said terminal means and a second operational state preventing said flow; and control means coupled with said coding means and said switching means for repeatedly exciting the latter and for simultaneously operating the coding means to repeatedly change the operational state thereof a preselected number of times during each interval between successive applications of said excitation to the switching means, whereby to effect coded ringing of all of said telephone instruments, said coding means including electrically responsive switching structure normally in one of said states, said control means including electrical energy supply means, circuitry operably coupling said supply means with said switching means and said switching structure, and timer means interposed in said circuitry for controlling the flow of electrical energy therein to effect said repeated excitation of the switching means and to control excitation of the switching structure to change the state thereof said preselected number of times during each interval between successive applications of excitation to the switching means.

5. In a telephone system having at least a pair of party lines and a number of ringing generators delivering output signals of different frequencies, and where each of said generators is employed to ring at least one particular telephone instrument on each of the party lines, apparatus for effecting coded ringing of all the instruments on the lines in the event of an emergency comprising:

a first stepper relay having a series of switching terminals and adapted to be coupled with one of said lines for successively connecting said switching terminals to said one line upon repeated excitation of said stepper relay;

a second stepper relay having a series of switching terminals and adapted to be coupled with the other of said lines for successively connecting the last-mentioned switching terminals to said other line in the same sequence as said first stepper relay upon repeated excitation of said second stepper relay;

circuit means adapted to be coupled with the outputs of said generators and coupled with the switching terminals of said stepper relays, said circuit means including circuitry for routing the output signal from each of said generators respectively to corresponding different switching terminals of said stepper relays;

coding means adapted to be operably associated with said generators and having a first operational state permitting said output signals to flow in said circuit means and a second operational state preventing said flow;

control means coupled with said coding means and said stepper relays for repeatedly exciting the stepper relays and for simultaneously operating the coding means to repeatedly change the operational state thereof a preselected number of times during each interval between successive applications of said excitation to the stepper relays, whereby to effect coded ringing of all of said telephone instruments on the party lines, said control means including electrical energy supply means and a remote control unit having a manually operable switch coupled with said supply means for rendering the control means operative and an indicator lamp responsive to operation of said switch; and means intercoupling said lamp and one of said stepper relays for increasing the voltage across the lamp in response to stepping operation of said one relay, whereby the brilliance of the lamp is increased to indicate proper operation of the stepper relays.

References Cited

UNITED STATES PATENTS

| | | | |
|---|---|---|---|
| 2,553,910 | 5/1951 | Gaffney et al. | 340—171 |
| 3,026,377 | 3/1962 | Sullivan | 340—156 X |
| 3,035,250 | 5/1962 | Durkee et al. | 340—156 X |
| 1,026,290 | 5/1912 | Wrenn | 340—155 |
| 1,356,488 | 10/1920 | Compare | 340—171 |
| 2,503,371 | 4/1950 | Bachelet | 340—171 |

ROBERT L. GRIFFIN, *Primary Examiner.*

W. S. FROMMER, *Assistant Examiner.*

U.S. Cl. X.R.

179—2; 340—150, 155, 171, 183, 346